United States Patent
Lorenzoni et al.

(10) Patent No.: US 7,603,923 B2
(45) Date of Patent: Oct. 20, 2009

(54) HYDRAULIC SERVO FOR A GEAR CHANGE

(75) Inventors: Marcello Lorenzoni, Bologna (IT); Nerio Mengoli, Casalecchio Di Reno (IT); Stefano Giorgini, Minerbio (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 426 days.

(21) Appl. No.: 11/707,430

(22) Filed: Feb. 16, 2007

(65) Prior Publication Data

US 2007/0207897 A1  Sep. 6, 2007

(30) Foreign Application Priority Data

Feb. 17, 2006  (EP)  .................................. 06425096

(51) Int. Cl.
*F16H 59/00*  (2006.01)
*F16H 61/00*  (2006.01)
*F16H 63/00*  (2006.01)

(52) U.S. Cl. ...................... 74/335; 74/337.5; 74/473.11
(58) Field of Classification Search ................... 74/335, 74/337.5, 473.11, 473.12, 473.36, 471 XY
See application file for complete search history.

(56) References Cited

U.S. PATENT DOCUMENTS

| | | | | |
|---|---|---|---|---|
| 4,653,352 A | * | 3/1987 | Nakao et al. | ................... 477/73 |
| 5,473,959 A | * | 12/1995 | Lasoen | ......................... 74/335 |
| 6,102,829 A | * | 8/2000 | Muddell et al. | ............... 477/77 |
| 6,422,104 B2 | * | 7/2002 | Kamiya | ....................... 74/335 |
| 7,464,617 B2 | * | 12/2008 | Baldascini et al. | ........... 74/335 |
| 2001/0037696 A1 | | 11/2001 | Meyer et al. | |

FOREIGN PATENT DOCUMENTS

| | | |
|---|---|---|
| DE | 20 29 338 A1 | 5/1971 |
| DE | 28 55 086 A1 | 2/1980 |
| EP | 0 271 234 A | 6/1988 |
| EP | 0 541 035 A | 5/1993 |
| EP | 1 544 492 A | 6/2005 |
| WO | WO 01/51829 A | 7/2001 |

OTHER PUBLICATIONS

European Search Report, EP 06 42 5096, Jul. 31, 2006, 3 pp.

* cited by examiner

*Primary Examiner*—David D. Le
(74) *Attorney, Agent, or Firm*—Kenneth L. Sherman, Esq.; Myers Andras Sherman LLP

(57) ABSTRACT

Described herein is a hydraulic servo for a gear change provided with a control shaft; the servo has: a frame; a first hydraulic actuator, which is carried by the frame and has two first chambers, which are alternatively filled with a pressurized fluid for displacing the control shaft axially in the two directions; two first solenoid valves, which control filling of the two first chambers; a second hydraulic actuator, which is carried by the frame and has at least one second chamber that is filled with a pressurized fluid for rotating the control shaft about its central axis; a second solenoid valve, which controls filling of the second chamber; and a supporting body, which is fixed to the frame, houses the solenoid valves, and has inside it a series of hydraulic circuits, which connect the solenoid valves themselves both to the chambers of the actuators and to a supply of the pressurized fluid.

12 Claims, 7 Drawing Sheets

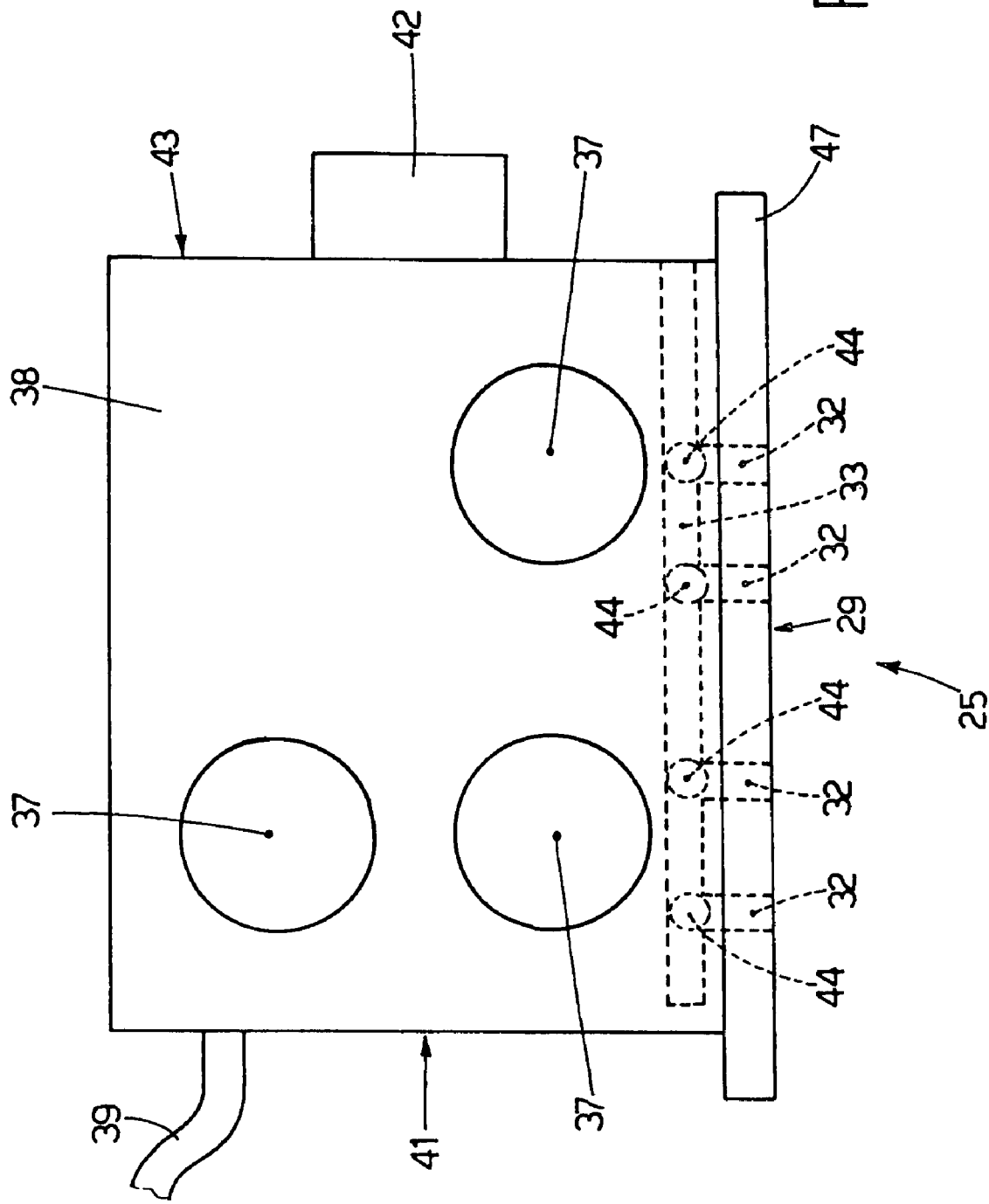

HYDRAULIC SERVO FOR A GEAR CHANGE

The present invention relates to a hydraulic servo for a gear change.

BACKGROUND OF THE INVENTION

There is an increasingly widespread use of servo-assisted gear changes, which are structurally similar to a manual gear change of a traditional type but for the fact that the clutch pedal and the gear lever operated by the driver are replaced by corresponding electrical or hydraulic servos. Using a manual servo-assisted gear change, the driver only has to issue the order to pass to a higher gear or else to a lower gear to a transmission control unit, and the transmission control unit autonomously carries out gear change by acting both on the engine and on the servos associated to the clutch and gear change.

An order for change of gear can be generated manually, i.e., following upon a command imparted by the driver, or else automatically, i.e., independently of the action of the driver. When the order for performing a change of gear is generated, the transmission control unit drives the clutch servo for opening the clutch so as to separate a primary shaft of the gear change mechanically from an engine shaft. At the same time, the transmission control unit acts on the engine control unit in order to reduce temporarily the driving torque supplied by the engine.

Once the transmission control unit has verified opening of the clutch, it drives the gear-change servo to disengage the gear currently engaged. When the transmission control unit has verified disengagement of the gear, it drives the gear-change servo for displacing the gear-change control shaft so as to enable engagement of the new gear. Once the transmission control unit has verified that the gear-change control shaft has reached the desired position, it drives the gear-change servo for engaging the new gear.

Finally, when the transmission control unit has verified engagement of the new gear, it drives the clutch servo for closing the clutch so as to render the primary shaft of the gear change and the engine shaft angularly fixed to one another. At the same time, the transmission control unit acts on the engine control unit for restoring the driving torque supplied by the engine.

Generally, the gear-change servo is of a hydraulic type and acts on a gear-change control shaft to impress on the control shaft both an axial displacement, i.e., along an axis of symmetry, for selecting the range of the gears, and a rotation about the axis of symmetry for engaging and disengaging the individual gears. Consequently, the gear-change servo comprises a first hydraulic actuator, mechanically coupled to the control shaft for axial displacement of the control shaft along a central axis thereof, and a second hydraulic actuator, mechanically coupled to the control shaft for rotating the control shaft about the central axis.

The first hydraulic actuator comprises two chambers, which are alternatively filled with a pressurized fluid for displacing the control shaft axially in the two directions. Filling of the two chambers of the first hydraulic actuator is controlled by two solenoid valves. Likewise, the second hydraulic actuator comprises one or two chambers, which are alternatively filled with a pressurized fluid for rotating the control shaft about the central axis. Filling of the two chambers of the second hydraulic actuator is controlled by two further solenoid valves.

It has been proposed of use a supporting body, which is screwed to a frame of the servo, houses all the solenoid valves and has inside it a series of hydraulic circuits, which connect the solenoid valves themselves both to the chambers of the actuators and to a supply of the pressurized fluid. The function of said supporting body is to render the operation of dismantling of the solenoid valves fast and simple in order to facilitate checking, cleaning and possible replacement of the solenoid valves. However, in known servos the supporting member is relatively complex to produce, in so far as it requires a large number of holes to be made and subsequent insertion of various ball plugs, which close in a fluid-tight way a part of the openings of the holes towards the outside.

SUMMARY OF THE INVENTION

The aim of the present invention is to provide a hydraulic servo for a gear change that will be free from the drawbacks described above and, in particular, will be easy and inexpensive to produce and will be very compact.

According to the present invention, a hydraulic servo is provided for a gear change as claimed in the attached claims.

BRIEF DESCRIPTION OF THE DRAWINGS

The present invention will now be described with reference to the annexed plate of drawings, which illustrate a non-limiting example of embodiment thereof, and in which:

FIGS. 6 and 7 are two top plan views of the supporting body of the solenoid valves of FIG. 4 with some internal pipes highlighted.

DETAILED DESCRIPTIONS OF THE INVENTION

Figure 1:
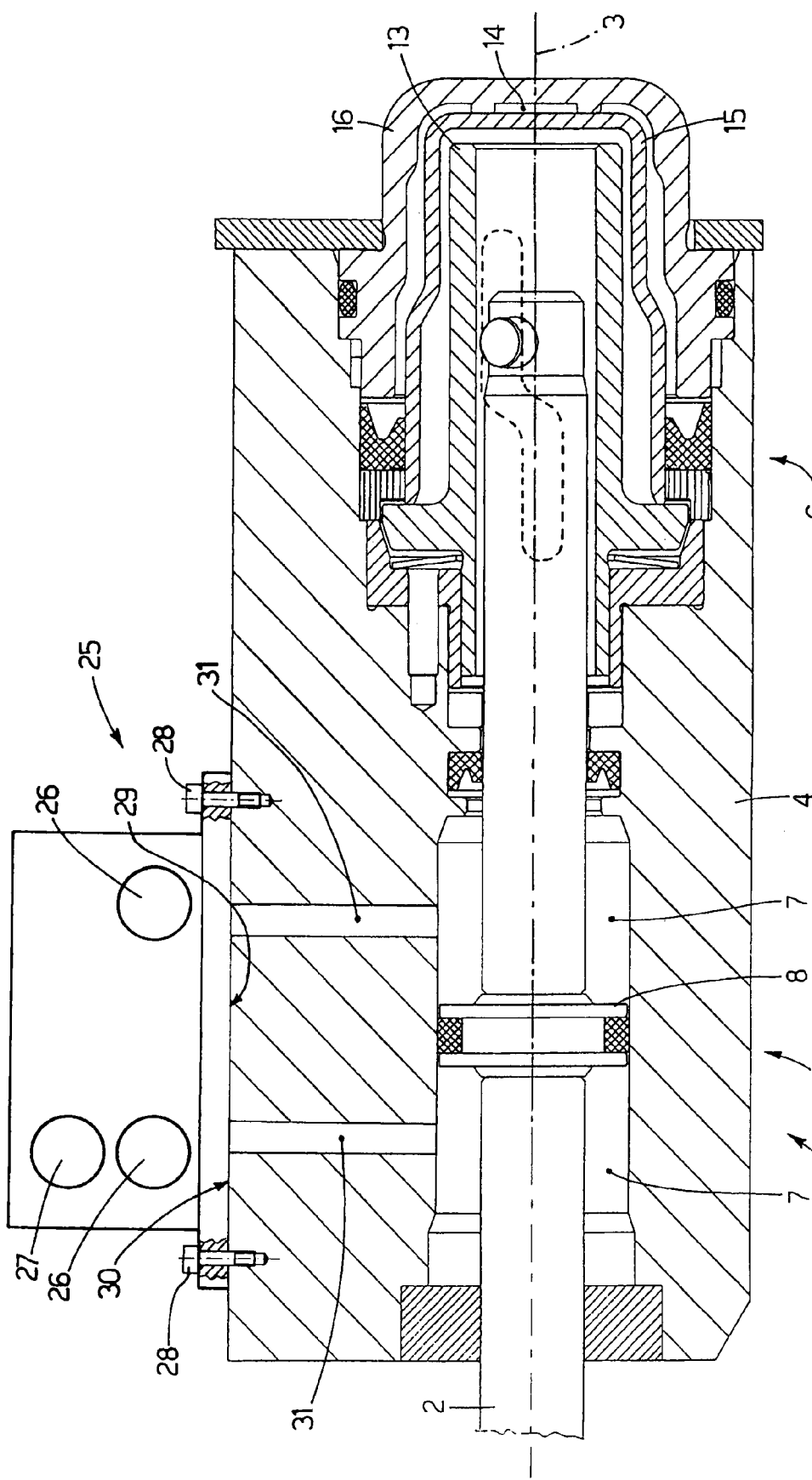
FIG. 1 is a schematic cross-sectional view, with parts removed for reasons of clarity, of a servo built in accordance with the present invention.

In FIG. 1, the reference number 1 designates as a whole a servo for a gear change, which is provided with a control shaft 2. The servo 1 acts on the control shaft 2 of the gear change to impress on the control shaft 2 both an axial displacement, i.e., along a central axis 3, for selecting the range of the gears, and a rotation about the central axis 3, for engaging and disengaging the individual gears. The servo 1 of the gear change comprises a fixed frame 4, which is traversed by the control shaft 2 and supports a first hydraulic actuator 5, mechanically coupled to the control shaft 2 for displacing the control shaft 2 axially, and a second hydraulic actuator 6, mechanically coupled to the control shaft 2 for rotating the control shaft 2 about the central axis 3.

Figure 2:
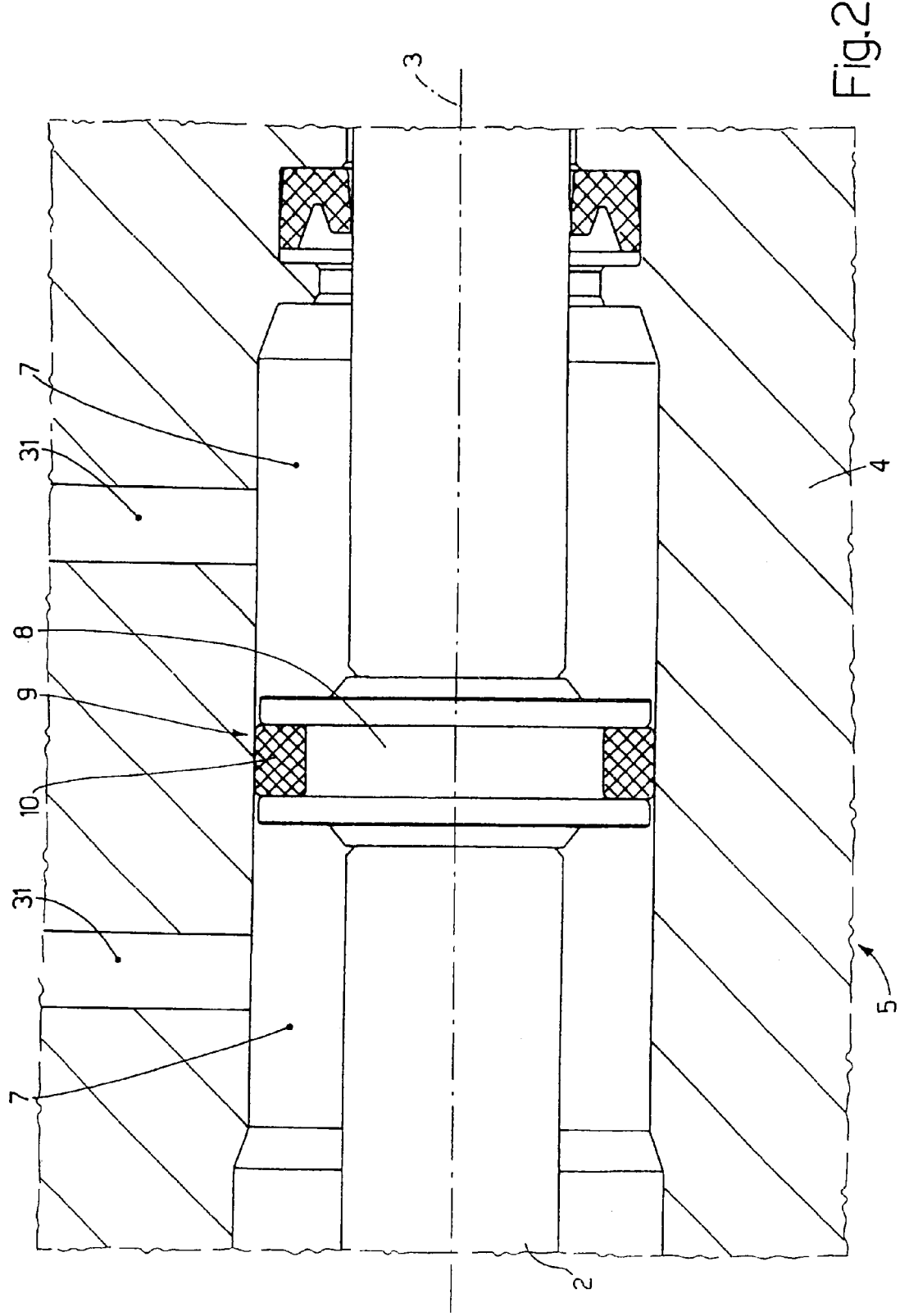
FIG. 2 is a view at an enlarged scale of a first hydraulic actuator of the servo of FIG. 1.

According to what is illustrated in FIG. 2, the first actuator 5 is set in a position corresponding to an intermediate portion of the control shaft 2 and has two chambers 7, which are alternatively filled with a pressurized fluid for displacing axially the control shaft 2 in the two directions. In particular, the chambers 7 are traversed by the control shaft 2, are set in series along the control shaft 2, and are separated from one another by a flange 8, which is fixed to the control shaft 2 and defines a piston of the first hydraulic actuator 5. The flange 8 comprises a central annular cavity 9, which receives an annular seal gasket 10.

Figure 3:
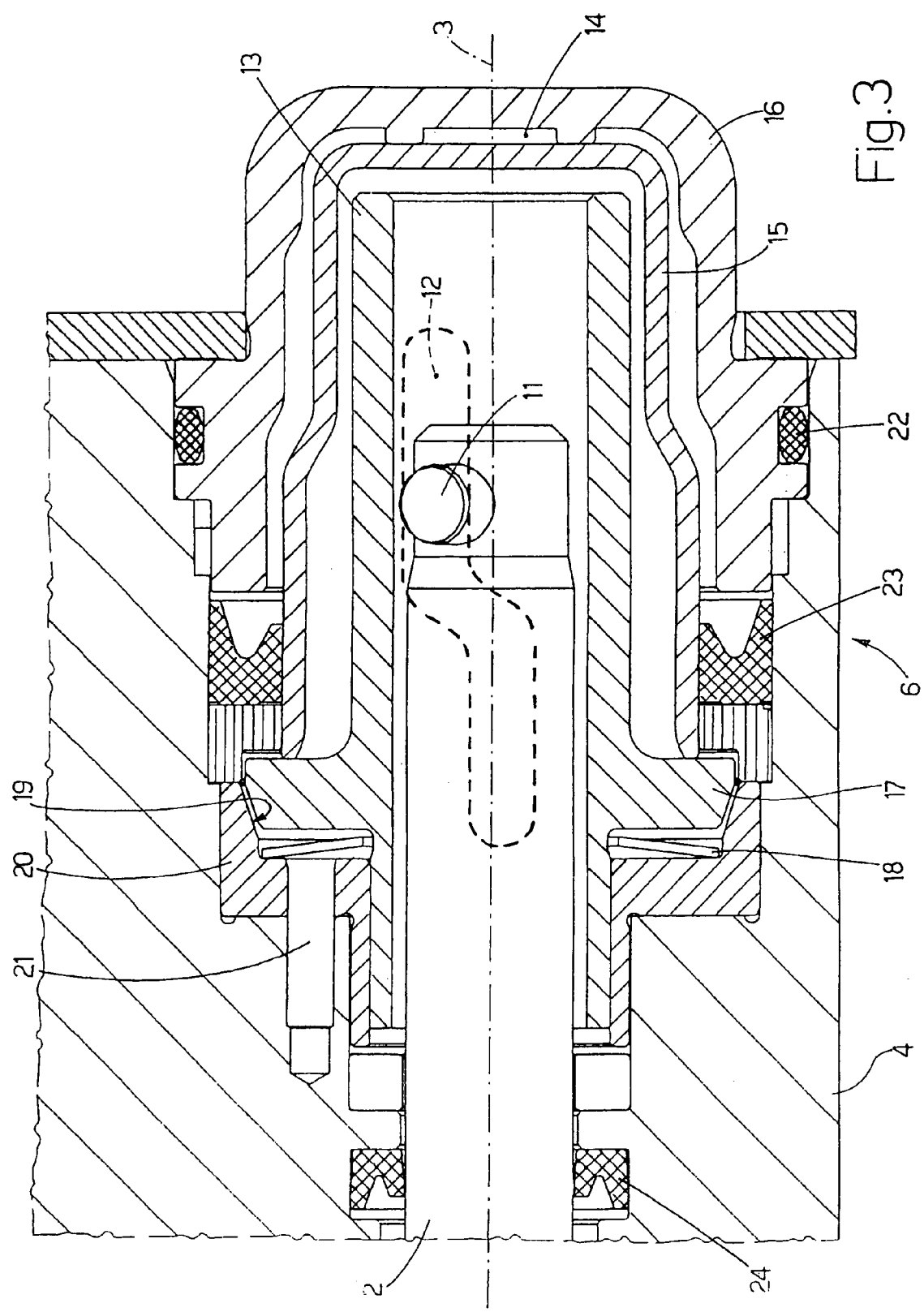
FIG. 3 is a view at an enlarged scale of a second hydraulic actuator of the servo of FIG. 1.

According to what is illustrated in FIG. 3, the second hydraulic actuator 6, is set in a position corresponding to one end of the control shaft 2 provided with a pin 11, which radially projects from the control shaft 2 and engages a cam 12 carried by a cylindrical tubular element 13 coaxial to the control shaft 2. The cam 12, that is the tubular element 13 carrying the cam 12, is normally free to rotate about the central axis 3 without any constraint, and the second hydraulic actuator 6 renders the cam 12, that is the tubular element 13 carrying the cam 12, angularly fixed to the fixed frame 4 to cause rotation of the control shaft 2 about its own central axis 3 during the axial displacement. In other words, when the second hydraulic actuator 6 is de-activated, i.e., when the cam 12 is free to rotate with respect to the fixed frame 4, the axial displacement of the control shaft 2 causes a rotation of the cam 12 about the central axis 3, and the control shaft 2 does not perform any rotation about the central axis 3. Instead, when the second hydraulic actuator 6 is activated, i.e., when the cam 12 is angularly fixed to the fixed frame 4, the axial displacement of the control shaft 2 forces the control shaft 2 to rotate about the central axis 3 under the thrust of the cam 12.

The tubular element 13 receives inside it an end portion of the control shaft 2 and is pushed axially by the second actuator 6 against the fixed frame 4 so as to block the tubular element 13 angularly against the fixed frame 4. The second actuator 6 has a chamber 14, which is filled with a pressurized fluid for displacing the tubular element 13 axially under the control of a solenoid valve (not illustrated). The chamber 14 is defined between an internal dome 15, which shares the central axis 3, is axially mobile, partially surrounds the tubular element 13, and rests against the tubular element 13, and an external dome 16, which is fixed to the fixed frame 4, shares the central axis 3, and partially surrounds the internal dome 15.

The tubular element 13 has a flange 17, which on one side constitutes a resting element for the internal dome 15 and on the other side is pressed against the fixed frame 4 so as to render the tubular element 13 angularly fixed to the fixed frame 4. Set between the flange 17 and the fixed frame 4 is an elastic body 18, in particular a Belleville washer, which tends to maintain the flange 17 of the tubular element 13 at a distance from the fixed frame 17. The flange 17 has a conical shape and is pushed by the second hydraulic actuator 6 against a conical seat 19, which has a complementary shape and is carried by the fixed frame 4.

According to a preferred embodiment, the fixed frame 4 is made of a first material and comprises a contrast insert 20, which is made of a second material different from the first material, is set in a position corresponding to the contrast area of the flange 17 of the tubular element 13, and defines the conical seat 19. The contrast insert 20 is made of a second material that affords a high coefficient of friction with respect to the flange 17 of the tubular element 13 to guarantee a high tightening force between the tubular element 13 and the frame 17. In addition, the contrast insert 20 is mechanically connected to the fixed frame 4 by means of a fixing pin 21.

In order to prevent leakages of the fluid used by the second hydraulic actuator 6, an annular seal gasket 22 set around the external dome 16, an annular seal gasket 23 set around the internal dome 15, and an annular seal gasket 24 set around the control shaft 2 are provided.

According to what is illustrated in FIG. 1, the servo 1 comprises a supporting body 25, which has a substantially parallelepipedal shape and houses two solenoid valves 26, which regulate filling of the two chambers 7 of the first actuator 5, and a solenoid valve 27, which regulates filling of the chamber 14 of the second actuator 6. In particular, the supporting body 25 is fixed to the frame 4 by means of four screws 28 so as to provide a plane connection wall 29 thereof in contact with a corresponding plane connection wall 30 of the frame 4.

Figure 4:
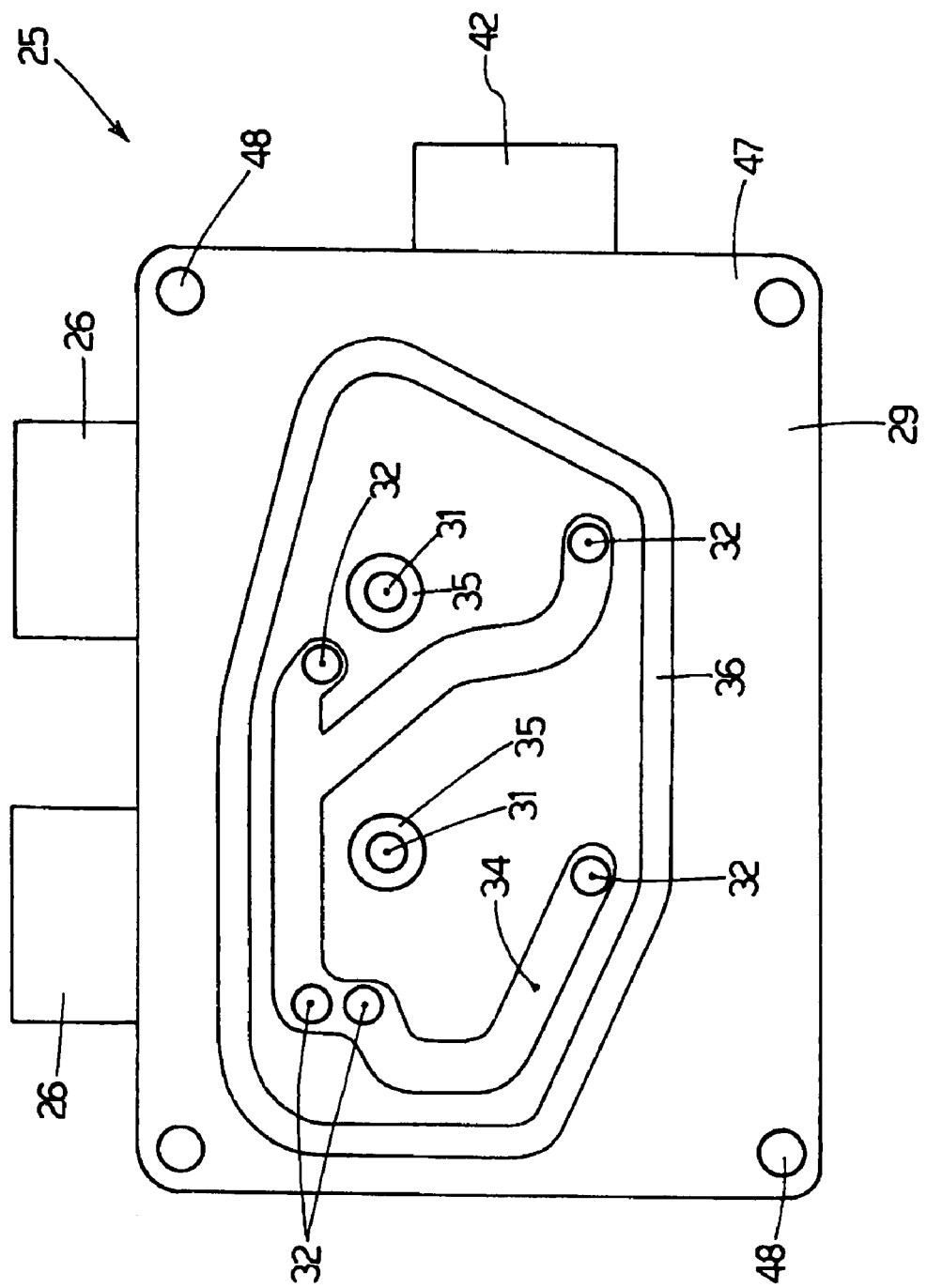
FIG. 4 is a schematic front view, with parts removed for reasons of clarity, of a supporting body of the solenoid valves of the servo of FIG. 1.
Figure 5:
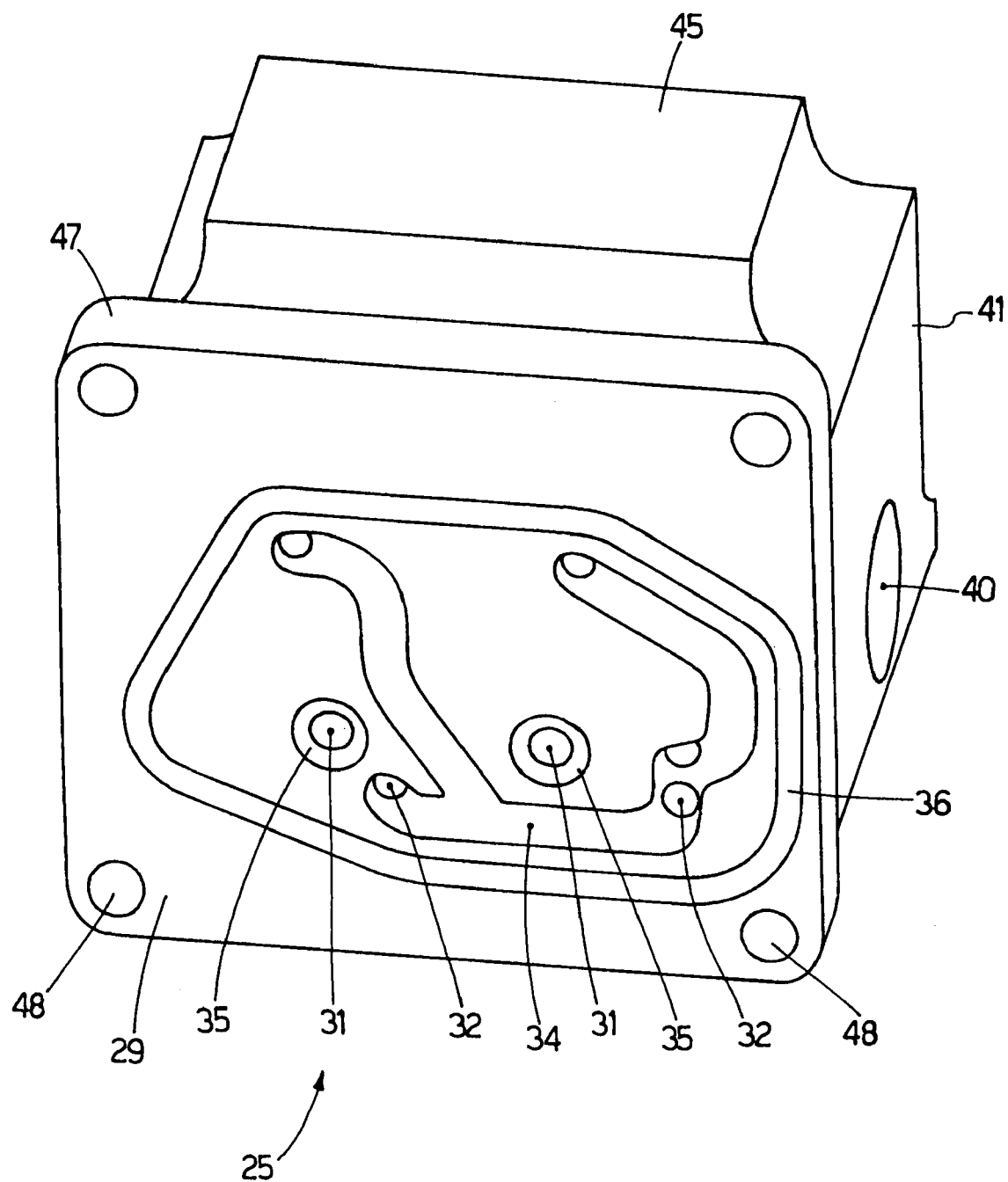
FIG. 5 is a perspective view, with further parts removed for reasons of clarity, of the supporting body of the solenoid valves of FIG. 4.

According to what is illustrated in FIG. 4, passing through the connection wall 29 of the supporting body 25 is a pair of actuation pipes 31, each of which connects a solenoid valve 26 with a chamber 7 of the first hydraulic actuator 5. In a position corresponding to the connection wall 29 there gives out a number of exhaust pipes 32, each of which originates in an exhaust manifold 33 (illustrated in FIGS. 7 and 8) for the fluid at ambient pressure. In addition, made in a position corresponding to the connection wall 29 is a recovery channel 34, which traverses and joins the exhaust pipes 32 and extends at least partially around the actuation pipes 31.

Set in a position corresponding to the connection wall 29 of the supporting body 25 and around each actuation pipe 31 is an annular seal gasket 35, which is housed in a corresponding groove made through the connection wall 29 of the supporting body 25. In addition, set in a position corresponding to the connection wall 29 of the supporting body 25 and around the recovery channel 34 and around the actuation pipes 31 is a seal gasket 36, which is housed in a corresponding groove made through the connection wall 29 of the supporting body 25.

The function of the recovery channel 34 that surrounds in almost completely the actuation pipes 31 is to recover the pressurized fluid that could leak from the seal gaskets 35.

According to a different embodiment (not illustrated), the recovery channel 34 completely surrounds the actuation pipes 31.

Figure 6:
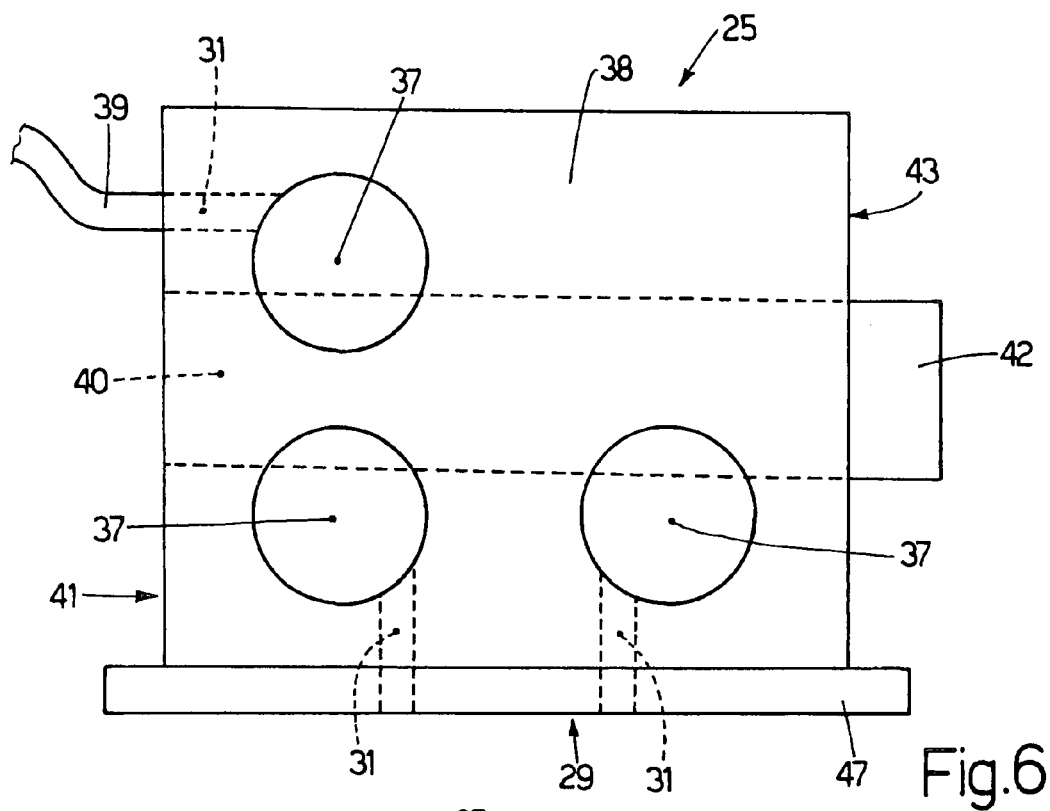

According to what is illustrated in FIG. 6, for each solenoid valve 26 or 27 the supporting body 25 has a blind housing hole 37, which is made through a wall 38 perpendicular to the connection wall 29. Originating from each housing hole 37 of a solenoid valve 26 of the first actuator 5 is an actuation pipe 31 passing through the connection wall 29 of the supporting body 25. Instead, originating from the housing hole 37 of the solenoid valve 27 of the second actuator 6 is a further actuation pipe 31, which proceeds in a flexible pipe 39 connected to the chamber 14 of the second actuator 6.

The supporting body 25 has a supply hole 40, which is made through a wall 41 perpendicular to the connection wall 29 and to the wall 38, involves each of the housing holes 37 and is connected to a supply of the pressurized fluid. In particular, the supply hole 40 is set symmetrically between the housing holes 37 so as to overlap each housing hole 37. The supply hole 40 is a through hole and is connected on one side to the supply of the pressurized fluid and on the opposite side to a maximum-pressure valve 42, which limits the maximum value of the pressure of the fluid within the supply hole 40.

Figure 8:
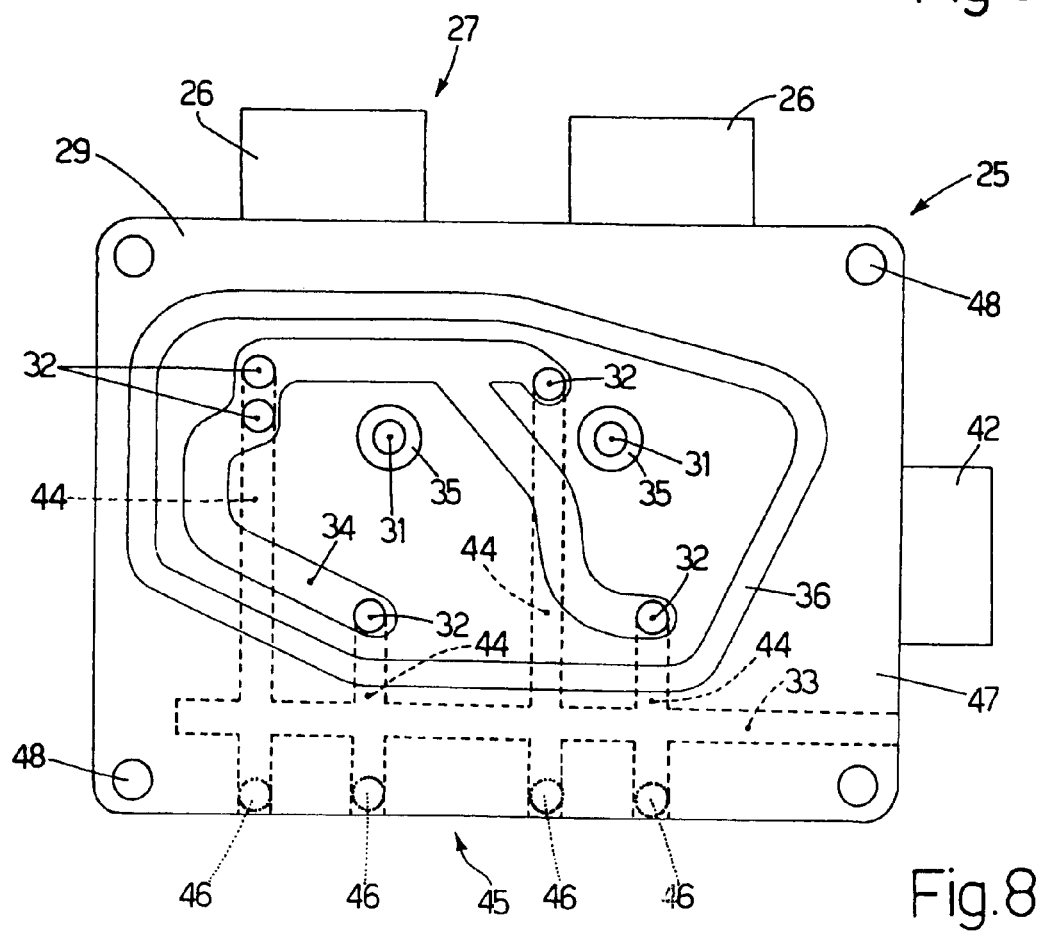
FIG. 8 is a further front view of the supporting body of the solenoid valves of FIG. 4 with some internal pipes highlighted.

According to what is illustrated in FIGS. 7 and 8, the exhaust manifold 33 is defined by a blind hole made in a wall 43 parallel and opposite to the wall 41 and is connected to a channel for recovery of the fluid at ambient pressure. The supply hole 40 extends between the wall 41 and the wall 43, and the maximum-pressure valve 42 is set in a position corresponding to the wall 41 and in the proximity of the exhaust manifold 33.

The exhaust pipes 32 are connected to the exhaust manifold 33 by means of the blind service holes 44, each of which can serve a number of exhaust pipes 32 aligned with respect to one another, is made through a wall 45 parallel and opposite to the wall 38, and in a position corresponding to the wall 45 is closed in a fluid-tight way by a ball plug 46.

According to a preferred embodiment, present around the connection wall 29 of the supporting body 25 is a rim 47, made through which are four through holes 48, which house the screws 28 for fixing the supporting body 25 to the frame 4.

According to a different embodiment (not illustrated), the second actuator 6 has two chambers 14 controlled by two solenoid valves 27. Consequently, the supporting body 25 houses two solenoid valves 26 and two solenoid valves 27.

The supporting body 25 described above presents numerous advantages, in so far as it enables the operation of dismantling of the solenoid valves to be rendered fast and simple and is moreover inexpensive to produce. In particular, the supporting body 25 described above is inexpensive to produce in so far as it requires a limited number of holes to be made and subsequent engagement of just a few ball plugs 46 which seal in a fluid-tight way a part of the openings of the holes towards the outside. In particular, the use of the ball plugs 46 is limited only to the service holes 44 that connect the exhaust pipes 32 to the exhaust manifold 33.

The invention claimed is:

1. A hydraulic servo (1) for a gear change provided with a control shaft (2); the servo (1) comprising:
   a frame (4) having a first plane connection wall (30);
   a first hydraulic actuator (5), which is carried by the frame (4) and comprises two first chambers (7), which are alternatively filled with a pressurized fluid for displacing the control shaft (2) axially in two directions;
   two first solenoid valves (26), which control filling of the two first chambers (7) of the first hydraulic actuator (5);
   a second hydraulic actuator (6), which is carried by the frame (4) and comprises at least one second chamber (14), which is filled with a pressurized fluid for rotating the control shaft (2) about a central axis (3);
   a second solenoid valve (27), which controls filling of the second chamber (14) of the second hydraulic actuator (6); and
   a supporting body (25), which is fixed to the frame (4), has a second plane connection wall (29) set in contact with the first connection wall (30) of the frame (4), houses the solenoid valves (26, 27), and has inside it a series of hydraulic circuits (31, 40) that connect the solenoid valves (26, 27) themselves both to the chambers (7, 14) of the actuators (5, 6) and to a supply of the pressurized fluid;
   the servo (1) is characterized in that:
   passing through the second connection wall (29) of the supporting body (25) is a pair of actuation pipes (31), each of which connects a first solenoid valve (26) to a first chamber (7) of the first hydraulic actuator (5);
   in a position corresponding to the second connection wall (29) of the supporting body (25) there gives out a number of exhaust pipes (32), each of which originates in an exhaust manifold (33) of the fluid at ambient pressure; and
   made in a position corresponding to the second connection wall (29) is a recovery channel (34), which traverses and joins the exhaust pipes (32) and extends at least partially around the actuation pipes (31).

2. The servo (1) according to claim 1, wherein, set in a position corresponding to the second connection wall (29) of the supporting body (25) and around the each actuation pipe (31), is a first annular seal gasket (35).

3. The servo (1) according to claim 1, wherein a rim (47) is present around the second connection wall (29) of the supporting body (25), in which four through holes (48) are made, which house screws (28) for fixing the supporting body (25) to the frame (4).

4. The servo (1) according to claim 1, wherein a flexible pipe (39) is provided, which connects the second solenoid valve (27) to the second chamber (14) of the second hydraulic actuator (6).

5. The servo (1) according to claim 1, wherein: the first actuator (5) is set in a position corresponding to an intermediate portion of the control shaft (2); and the two first chambers (7) are traversed by the control shaft (2), are set in series along the control shaft (2), and are separated from one another by a first flange, which is fixed to the control shaft (2) and defines a piston of the first actuator (5).

6. The servo (1) according to claim 1, wherein the supporting body (25) has for each solenoid valve (26, 27) a blind housing hole (37), which is made through a third wall (38) perpendicular to the second connection wall (29).

7. The servo (1) according to claim 6, wherein the supporting body (25) has a supply hole (40), which is made through a fourth wall (41) perpendicular to the second connection wall (29) and to the third wall (38), involves each of the housing holes (37) and is connected to a supply of the pressurized fluid.

8. The servo (1) according to claim 7, wherein the supply hole (40) is a through hole and is connected on one side to the supply of the pressurized fluid and on the opposite side to a maximum-pressure valve (42) that limits the maximum value of the pressure of the fluid within the supply hole (40).

9. The servo (1) according to claim 1, wherein the exhaust pipes (32) are connected to the exhaust manifold (33) by means of blind service holes (44), each of which is made through a fourth wall (45) and is closed in a fluid-tight way by a ball plug (46) in a position corresponding to the fourth wall (45).

10. The servo (1) according to claim 9, wherein at least one service hole (44) involves a number of exhaust pipes (32) aligned with respect to one another.

11. The servo (1) according to claim 1, wherein set in a position corresponding to the second connection wall (29) of the supporting body (25) and around the recovery channel (34) and around the actuation pipes (31) is a second seal gasket (36).

12. The servo (1) according to claim 11, wherein the second seal gasket (36) is housed in a groove made through the second connection wall (29) of the supporting body (25).

* * * * *